United States Patent [19]

Franke

[11] Patent Number: 4,826,595
[45] Date of Patent: May 2, 1989

[54] APPARATUS FOR SEPARATING FLOWABLE CONSTITUENTS FROM A SUBSTANCE MIXTURE

[75] Inventor: Rolf Franke, Lübeck, Fed. Rep. of Germany

[73] Assignee: Nordischer Maschinenbau Rud. Baader GmbH & Co. KG, Lübeck, Fed. Rep. of Germany

[21] Appl. No.: 100,586

[22] Filed: Sep. 24, 1987

[30] Foreign Application Priority Data

Oct. 1, 1986 [DE] Fed. Rep. of Germany ....... 3633396

[51] Int. Cl.⁴ .......................... B30B 9/06; B01D 33/04
[52] U.S. Cl. ...................................... 210/386; 210/400; 210/401; 210/405; 210/783; 210/784; 100/110; 100/118; 100/121
[58] Field of Search ............... 210/386, 401, 400, 783, 210/784, 405; 100/110, 118, 121

[56] References Cited

U.S. PATENT DOCUMENTS 3,669,011  6/1972  Jacquelin ............................ 100/118

Primary Examiner—David L. Lacey
Assistant Examiner—Thi Dang
Attorney, Agent, or Firm—Thomas R. Morrison

[57] ABSTRACT

The invention relates to an apparatus for separating the flowable constituents from a mixture of flowable and non-flowable constituents particularly for the preparation of foodstuffs, the apparatus includes a driven perforated drum having a perforated circumferential surface, a pressure belt enclosing part of the circumference thereof and pressable onto the same by at least one pressure roller, as well as a supply mechanism for supplying the product to be treated into an entry wedge formed between the perforated drum and the pressure belt.

20 Claims, 2 Drawing Sheets

U.S. Patent  May 2, 1989  Sheet 1 of 2  4,826,595
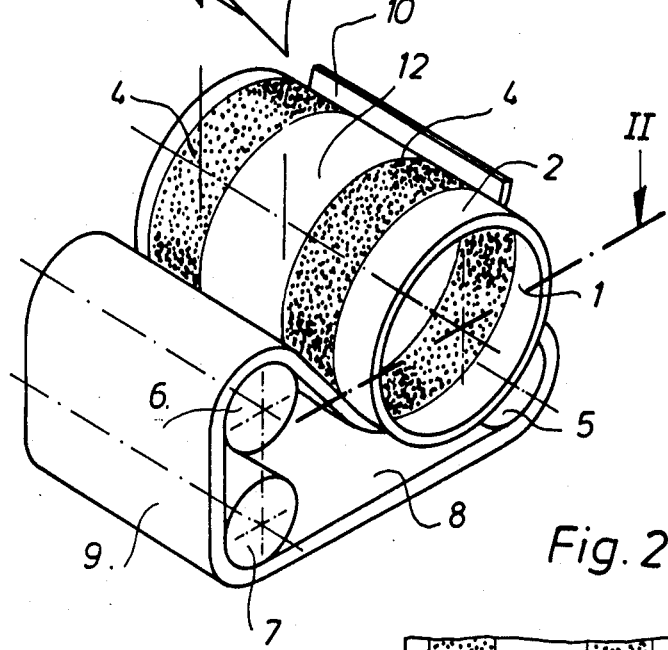
Fig. 1
Fig. 2
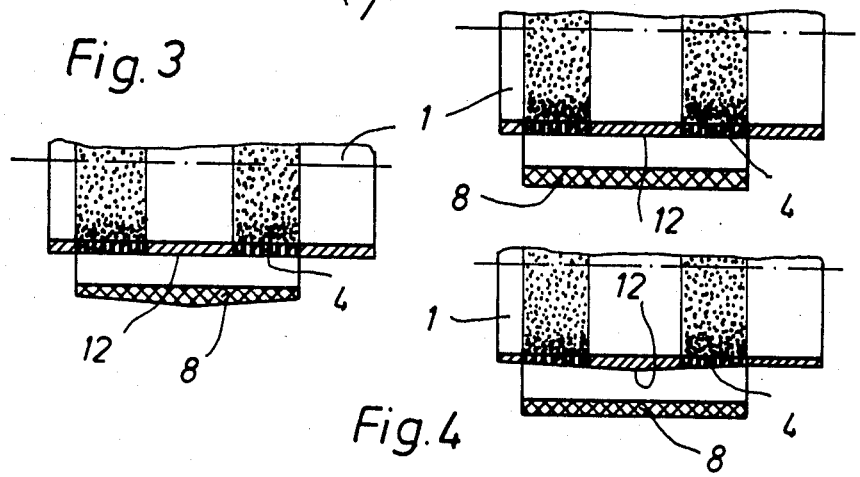
Fig. 3
Fig. 4

APPARATUS FOR SEPARATING FLOWABLE CONSTITUENTS FROM A SUBSTANCE MIXTURE

BACKGROUND OF THE INVENTION

1. Field of the Invention

The invention relates to an apparatus for separating the flowable constituents from a mixture of flowable and non-flowable constituents particularly for the preparation of foodstuffs, the apparatus comprising a driven perforated drum having a perforated circumferential surface, a pressure belt enclosing part of the circumference thereof and pressable onto the same by means of at least one pressure roller, as well as a supply mechanism for supplying the product to be treated into an entry wedge formed between the perforated drum and the pressure belt.

2. Prior Art

The basic concept of such apparatus is that of a separator type, as disclosed, for example, in East German Pat. No. 96 155. The substance mixture introduced into such an apparatus and formed from flowable and non-flowable constituents is, after feeding and drawing into the wedge between the perforated drum and the pressure belt first pressed onto the perforated drum as a result of the radial pressure derived from the axial tension of the belt and in this way is supplied to the actual pressing point. This is formed by a pressure roller supporting the pressure belt and settable against the perforated drum, so that a pressure gap can be adjusted, in which, as a result of the elasticity of the pressure belt, the outflow of the flowable constituents through the perforations of the perforated drum into the interior thereof is effected through quasi-hydraulic pressure. In contrast thereto, the non-flowable constituents pass through the pressure gap accompanied by elastic embedding in the pressure belt and are subsequently stripped from the outer circumference of the perforated drum, if they have not been dropped already after release through the pressure gap.

Such apparatuses permit, in an uncomplicated manner, the separation of meat from tissues, bones and skin, so that they are mainly used in the production of sausages. However, as a function of the working product, particularly in the case of meat portions mixed, for example, with bone fragments, it has been found that when a small proportion of such fragments or other hard parts can, as a result of the particle size thereof pass in unhindered manner through the openings of the perforated drum. This also occurs in the case of longish particles, if they pass into the separator with a radial alignment with respect to the perforated drum.

Even in the case of an obvious use of such apparatuses for the unpacking and recovery of incorrectly packed flowable foods, such as cheese, butter, etc., accompanied by the simultaneous separation thereof from the packing material residues similar problems occur. These are manifested by an inadequate degree of purity of the recovered material. The reason for this is that the openings act as a punching die with respect to the pressure belt and the normally metallic, plastic or paper packaging or separating films or foils, as a function of the characteristics of the material thereof are punched out at least over single openings, so that said parts are floated out together with the outflowing material into the interior of the perforated drum. However, this phenomenon also occurs disadvantageously in the case of stronger films or foils, because, as a result of the pressure action, they are forced into the openings of the perforated drum, the packing material membranes formed over said openings at least partially bursting or splitting. The resulting perforations in the foils admittedly do not initially bring about a separation of foil particles, because the foils' tips forming at the perforation points with the flow of the outflowing food material are merely drawn into the openings without tearing off. However, when the packing material residues have left the pressing zone subsequently, then they remain in this state due to the positive anchoring in the openings, as well as to the generally effective adhesive forces on the circumferential surface of the perforated drum, so that constrained stripping is necessary. The equipment provided to this end comprises a stripping blade which scrapes over the circumferential surface of the perforated drum. Part of the foils' tips drawn into the openings are sheared-off, so that during the next revolution they are floated into the interior of the perforated drum together with the freshly squeezed out food material and lead to the soiling of the recovered material.

An apparatus disclosed in German Pat. No. 32 11 625 aims at eliminating this disadvantage. It is based on the idea that shearing is avoidable if, through the moving back of the material filling the openings in the perforated drum and which can be looked upon as a hydraulic medium, there is a floating back of the packing parts which have entered the openings prior to stripping by means of the stripping blade. The highly elastic inner roller provided for this purpose led to this effect, but this has led to a deterioration in output and yield, so that this apparatus has not become widely used for reasons of economy.

3. Objects of the Invention

It is therefore a major problem of the present invention to overcome these disadvantages by suggesting an apparatus permitting a better separation of flowable and nonflowable constituents from a mixture thereof. It is a further object of the invention to provide an apparatus which, in particular, permits the recovery of incorrectly packed viscous materials. It is yet another object of the invention to propose such apparatus which achieves a high output or yield and without impairing the purity of the resulting product.

SUMMARY OF THE INVENTION

In an apparatus comprising a driven perforated drum having a perforated circumferential surface, a pressure belt enclosing part of the circumference thereof and pressable onto the same by means of at least one pressure roller, as well as a supply mechanism for supplying the treatment product into an entry wedge formed between the perforated drum and the pressure belt, this problem is solved, according to the present invention, in that the circumferential surface of the perforated drum has a non-perforated circumferential zone in its effective region. Advantageously, the supply mechanism should be positioned so as to be directed towards at least the central area of the non-perforated circumferential zone. It is particularly expedient with regard to the throughput if the perforated drum is designed such that the non-perforated circumferential zone covers the central portion of the perforated drum, on either side of which central portion the perforated marginal zones will follow. It is favourable for the outflow of the material if the pressure belt covering the non-perforated circumferential zone and the perforated marginal zones has a thickness decreasing from the centre towards the edges. This effect can also be achieved if the effective region of the perforated drum is designed as a double cone, whose largest diameter is provided in the centre of the non-perforated circumferential zone.

When using the apparatus for the recovery of incorrectly packed viscous materials, it is advantageous if the circumferential surface of the perforated drum facing the pressure belt is, in the vicinity of its non-perforated circumferential zone, provided with grooves running substantially parallel to the perforated drum axis and extending into the perforated marginal zones, because in this way it can be ensured that no material film builds up on the circumferential surface of the perforated drum on which film the packing material would be able to slide in the vicinity of the perforated marginal zones. As a result, it is achieved that the packing material foils or films remain in the region of the non-perforated circumferential zone, so that the risk of punching through and therefore impurification is prevented.

This effect can be improved further in that at least in the transition region between the non-perforated circumferential zone and the perforated marginal zones, radial grooves are provided, the depth of the grooves preferably being deeper than that of the radial grooves.

BRIEF DESCRIPTION OF THE DRAWINGS

Other and further objects of the present invention will be apparent from the following description and claims and are illustrated in the accompanying drawings, which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings FIG. 1 shows an overall view of the apparatus in an axonometric representation with a supply mechanism in an exploded arrangement;

FIG. 2 shows a cross-section through the perforated drum along section line II;

FIG. 3 shows a cross-section corresponding to FIG. 2 with a modified pressure belt;

FIG. 4 shows a cross-section corresponding to FIG. 2 with a modified perforated drum.

DETAILED DESCRIPTION OF THE PREFERRED EMBODIMENT

Figure 5:
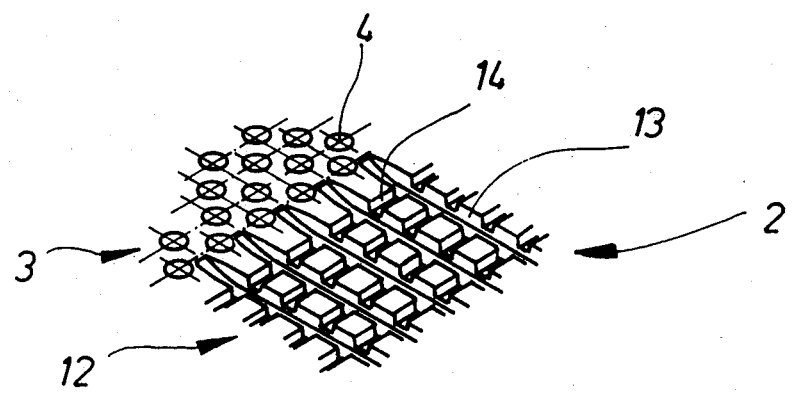
FIG. 5 shows a detail of the perforated drum in an axonometric representation.

In a not shown frame of a press-passing or mincing machine constructed in known per se manner, there are provided between not shown side walls a perforated drum 1 having openings 4 passing through cylindrical zones of its circumferential surface 2, a pressure roller 5 adjustable with respect to its position relative to the circumferential surface 2, as well as a deflection roller 6 and a tension roller 7. Whilst the latter are arranged as idler rollers, i.e. so as to revolve loosely, the perforated drum 1 and the pressure roller 5 are driven to rotate at an at least approximately equal circumferential speed. The rollers 5, 6 and 7 carry a flexible pressure belt 8 revolving in playfree manner between the side walls and which encloses the perforated drum 1 over part of its circumference. The pressure belt 8 can be compressed to a fraction of its thickness by the pressure roller 5, the belt's outer surface 9, which is designed with a good grip, e.g. by knurling, being held under the pressure against the circumferential surface 2 of the perforated drum 1. Downstream of the pressure roller 5, when seen in the rotation direction of the perforated drum 1, there is positioned a stripping mechanism 10 with at least one stripping blade, which stripping mechanism is adjustable to the narrowest gap with respect to the circumferential surface 2 of the perforated drum 1. Above an entry wedge formed by the pressure belt 8 and the perforated drum 1, there is provided a supply or feeding device 11, which allows the supply of pressing material into a circumferential zone 12 arranged centrally and not provided with openings 4.

The function of the apparatus is as follows:

The material to be treated or processed is introduced into the entry wedge between pressure belt 8 and perforated drum 1 by means of supply mechanism 11 and is drawn into the enclosing or looping area between perforated drum 1 and pressure belt 8 as a result of the revolution of these two parts. The material is pressurized initially by the radial pressure component resulting from the tension of the pressure belt 8. Due to the lack of perforations of the circumferential surface 2 in the charging or supply region of the perforated drum 1, the material to be treated is shaped into a material band, whose flowable constituents start to flow in the direction of the only remaining way out, namely along the generatrixes (circumferential lines) of the perforated drum 1. Grooves 13, located, as shown in FIG. 5, in the region of the non-perforated circumferential zone 12 of the perforated drum 1 facilitates the outflow of the material into perforated marginal zones 3, so that the building-up of a sliding film is avoided, because such a film would lead to the risk of packing material films or foils passing into the area of the perforated marginal zones 3, where it could be punched over the openings 4 by the pressure belt 8. This risk is also counteracted by radial grooves 14, which bring about a positive adhesion between the packing foils and the perforated drum 1, without the outflow of squeezed out material being prevented due to the greater depth of the grooves 13. Thus, while the clamping force acting between the perforated drum 1 and the pressure belt 8 ensures that the solid particles of the material to be treated are held clamped and consequently secured, the flowable constituents flow towards the perforated marginal zones 3 and, at the latest on reaching the actual pressure zone in the region of pressure roller 5, flow out through the openings 4 into the interior of the perforated drum 1.

To assist the outflow of the flowable constituents and simultaneously to retain the solid constituents, the pressure belt 8 can have a thickness which decreases from the centre line to the marginal areas. The outer surface 9 of the pressure belt 8 coming into contact with the material to be treated is preferably flat and the inner surface facing the rollers 5, 6 and 7 is preferably roof-shaped. In this case, the cylindrical configuration of the pressure roller 5 is retained, whilst the deflection roller 6 and the tension roller 7 are given a circumferential surface design adapted to the shape of the inner surface of the pressure belt 8. Therefore, a higher pressure zone forms in the central region of the pressure belt 8, which pressure decreases towards the marginal areas thereof.

The same effect is obtained if the perforated drum 1 is designed as a double cone with maximum diameter in the middle of its working surface.

I claim:

1. Apparatus for the processing of a material mixture containing flowable and non-flowable components, particularly in the preparation of foodstuffs, by separating said flowable components from said mixture, said apparatus comprising
   a driven drum defining a
   a pressure belt enclosing part of said circumferential surface and forming an entry wedge with said drum;
   at least one pressure roller positioned so as to press said belt onto said circumferential surface;
   supply means for supplying said mixture to be processed into said entry wedge formed between said drum and said pressure belt,
   said circumferential surface includes at least one non-perforated circumferential zone passing completely around a circumference of said drum and at least one perforated circumferential zone, axially adjacent said non-perforated circumferential zone and passing completely around said circumference of said drum.

2. Apparatus as claimed in claim 1, wherein said supply means includes means for feeding said mixture to at least an axially central region of said at least one non-perforated circumferential zone and for preventing direct feeding of said mixture to at least one of said perforated circumferential zones.

3. Apparatus accordng to claim 2, wherein:
   said at least one non-perforated circumferential zone is axially centered in said drum;
   said at least one perforated circumferential zone being at least first and second perforated circumferential zones;
   said first perforated circumferential zone being disposed adjacent a first edge of said at least one non-perforated circumferential zone; and
   said second perforated circumferential zone being disposed adjacent a second opposed edge of said at least one non-perforated circumferential zone.

4. Apparatus according to claim 1, wherein:
   said at least one non-perforated circumferential zone is axially centered in said drum;
   said at least one perforated circumferential zone being at least first and second perforated circumferential zones;
   said first perforated circumferential zone being disposed adjacent a first edge of said at least one non-perforated circumferential zone; and
   said second perforated circumferential zone being disposed adjacent a second opposed edge of said at least one non-perforated circumferential zone.

5. Apparatus for the processing of a material mixture containing flowable and non-flowable components by separating said flowable components from said mixture, said apparatus comprising:
   a driven drum defining a circumferential surface;
   a pressure belt enclosing part of said circumferential surface and forming an entry wedge with said drum;
   at least one pressure roller positioned so as to press said belt onto said circumferential surface; and
   supply means for supplying said mixture into said entry wedge;
   at least one non-perforated circumferential zone in said circumferential surface;
   at least one perforated circumferential zone in said circumferential surface; and
   said pressure belt has a thickness decreasing from its center toward its edges.

6. Apparatus as claimed in claim 5 wherein said circumferential surface of said drum is provided with grooves in the region of said at least one non-perforated circumferential zone, said grooves extending substantially parallel to a longitudinal axis of said drum, and into said at least one perforated zone.

7. Apparatus for the processing of a material mixture containing flowable and non-flowable components by separating said flowable components from said mixture, said apparatus comprising:
   a driven drum defining a circumferential surface;
   a pressure belt enclosing part of said circumferential surface and forming an entry wedge with said drum;
   at least one pressure roller positioned so as to press said belt onto said circumferential surface; and
   supply means for supplying said mixture into said entry wedge;
   at least one non-perforated circumferential zone in said circumferential surface;
   at least one perforated circumferential zone in said circumferential surface;
   said supply means includes means for feeding said mixture to at least an axially central region of said at least one non-perforated circumferential zone;
   said pressure belt has a thickness decreasing from its center toward its edges.

8. Apparatus for the processing of a material mixture containing flowable and non-flowable components by separating said flowable components from said mixture, said apparatus comprising:
   a driven drum defining a circumferential surface;
   a pressure belt enclosing part of said circumferential surface and forming an entry wedge with said drum;
   at least one pressure roller positioned so as to press said belt onto said circumferential surface; and
   supply means for supplying said mixture into said entry wedge;
   at least one non-perforated circumferential zone in said circumferential surface;
   at least one perforated circumferential zone in said circumferential surface;
   said at least one non-perforated circumferential zone is axially centered in said drum;
   said at least one perforated circumferential zone being at least first and second perforated circumferential zones;
   said first perforated circumferential zone being disposed adjacent a first edge of said at least one non-perforated circumferential zone; and
   said second perforated circumferential zone being disposed adjacent a second opposed edge of said at least one non-perforated circumferential zone;
   said pressure belt covering at least one of said at least on non-perforated circumferential zone and said at least one perforated zone, has a thickness decreasing from an axial center thereof toward its edges.

9. Apparatus for the processing of a material mixture containing flowable and non-flowable components by separating said flowable components from said mixture, said apparatus comprising:
   a driven drum defining a circumferential surface;
   a pressure belt enclosing part of said circumferential surface and forming an entry wedge with said drum;

at least one pressure roller positioned so as to press said belt onto said circumferential surface; and supply means for supplying said mixture into said entry wedge;

at least one non-perforated circumferential zone in said circumferential surface;

at least one perforated circumferential zone in said circumferential surface; and said drum has a shape of a double cone having a maximum diameter in an axial centre of said at least one non-perforated circumferential zone.

10. Apparatus as claimed in claim 9, wherein said circumferential surface of said drum is provided with grooves in the region of said at least one non-perforated circumferential zone, said grooves extending substantially parallel to a longitudinal axis of said drum, and into said at least one perforated marginal zone.

11. Apparatus for the processing of a material mixture containing flowable and non-flowable components by separating said flowable components from said mixture, said apparatus comprising:

a driven drum defining a circumferential surface;

a pressure belt enclosing part of said circumferential surface and forming an entry wedge with said drum;

at least one pressure roller positioned so as to press said belt onto said circumferential surface; and supply means for supplying said mixture into said entry wedge;

at least one non-perforated circumferential zone in said circumferential surface;

at least one perforated circumferential zone in said circumferential surface;

said supply means includes means for feeding said mixture to at least an axially central region of said at least one non-perforated circumferential zone;

said drum has a shape of a double cone, said double cone having a maximum diameter in an axial centre of said at least on non-perforated circumferential region.

12. Apparatus for the processing of a material mixture containing flowable and non-flowable components by separating said flowable components from said mixture, said apparatus comprising:

a driven drum defining a circumferential surface;

a pressure belt enclosing part of said circumferential surface and forming an entry wedge with said drum;

at least one pressure roller positioned so as to press said belt onto said circumferential surface; and supply means for supplying said mixture into said entry wedge;

at least one non-perforated circumferential zone in said circumferential surface;

at least one perforated circumferential zone in said circumferential surface;

said at least one non-perforated circumferential zone is axially centered in said drum;

said at least one perforated circumferential zone being at least first and second perforated circumferential zones;

said first perforated circumferential zone being disposed adjacent a first edge of said at least one non-perforated circumferential zone; and said second perforated circumferential zone being disposed adjacent a second opposed edge of said at least one non-perforated circumferential zone;

said pressure belt covering at least one of said at least one non-perforated circumferential zone and said at least one perforated zone, and has a thickness decreasing from an axial centre thereof toward its edges.

said drum has a shape of a double cone, said double cone having a maximum diameter in an axial centre of said at least on non-perforated circumferential region.

13. Apparatus for the processing of a material mixture containing flowable and non-flowable components by separating said flowable components from said mixture, said apparatus comprising:

a driven drum defining a circumferential surface;

a pressure belt enclosing part of said circumferential surface and forming an entry wedge with said drum;

at least one pressure roller positioned so as to press said belt onto said circumferential surface; and supply means for supplying said mixture into said entry wedge;

at least one non-perforated circumferential zone in said circumferential surface;

at least one perforated circumferential zone in said circumferential surface; and said circumferential surface of said drum includes grooves in the region of said at least one non-perforated circumferential zone, said grooves extending substantially parallel to a longitudinal axis of said perforated drum, and into said at least one perforated zone.

14. Apparatus as claimed in claim 13, further includes radial grooves at least in a region between said at least one non-perforated circumferential zone and said at least one perforated zone.

15. Apparatus as claimed in claim 14, wherein said grooves substantially parallel to the longitudinal axis are deeper than said radial grooves.

16. Apparatus for the processing of a material mixture containing flowable and non-flowable components by separating said flowable components from said mixture, said apparatus comprising:

a driven drum defining a circumferential surface;

a pressure belt enclosing part of said circumferential surface and forming an entry wedge with said drum;

at least one pressure roller positioned so as to press said belt onto said circumferential surface; and supply means for supplying said mixture into said entry wedge;

at least one non-perforated circumferential zone in said circumferential surface;

at least one perforated circumferential zone in said circumferential surface;

said supply means includes means for feeding said mixture to at least an axially central region of said at least one non-perforated circumferential zone;

said circumferential surface of said drum includes grooves in the region of said at least one non-perforated circumferential zone, said grooves extending substantially parallel to a longitudinal axis of said perforated drum, and into said at least one perforated zone.

17. Apparatus as claimed in claim 16, further including radial grooves at least in a region between said at least one non-perforated circumferential zone and said at least one perforated zone.

18. Apparatus for the processing of a material mixture containing flowable and non-flowable components by separating said flowable components from said mixture, said apparatus comprising:

a driven drum defining a circumferential surface;

a pressure belt enclosing part of said circumferential surface and forming an entry wedge with said drum;

at least one pressure roller positioned so as to press said belt onto said circumferential surface; and supply means for supplying said mixture into said entry wedge;

at least one non-perforated circumferential zone in said circumferential surface;

at least one perforated circumferential zone in said circumferential surface;

said at least one non-perforated circumferential zone is axially centered in said drum;

said at least one perforated circumferential zone being at least first and second perforated circumferential zones;

said first perforated circumferential zone being disposed adjacent a first edge of said at least one non-perforated circumferential zone; and said second perforated circumferential zone being disposed adjacent a second opposed edge of said at least one non-perforated circumferential zone;

said circumferential surface of said drum includes grooves in the region of said at least one non-perforated circumferential zone, said grooves extending substantially parallel to a longitudinal axis of said perforated drum, and into said at least one perforated zone.

19. Apparatus as claimed in claim 18, further including radial grooves at least in a region between said at least one non-perforated circumferential zone and said at least one perforated zone.

20. Apparatus as claimed in claim 19, wherein said grooves substantially parallel to the longitudinal axis are deeper than said radial grooves.

* * * * *